United States Patent
Zaima et al.

(10) Patent No.: US 8,908,225 B2
(45) Date of Patent: Dec. 9, 2014

(54) IMAGE FORMING APPARATUS IN WHICH TONE CORRECTION SETTING IS CONTROLLED

(75) Inventors: Nobuhiko Zaima, Kashiwa (JP); Tomohisa Itagaki, Abiko (JP); Yasuhito Shirafuji, Kashiwa (JP); Takahiro Ishihara, Maebashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 13/472,703

(22) Filed: May 16, 2012

(65) Prior Publication Data

US 2012/0314227 A1  Dec. 13, 2012

(30) Foreign Application Priority Data

Jun. 9, 2011  (JP) ................................. 2011-129541

(51) Int. Cl.
*G06K 15/02* (2006.01)
*H04N 1/60* (2006.01)

(52) U.S. Cl.
CPC ........... *H04N 1/6027* (2013.01); *H04N 1/6033* (2013.01); *H04N 1/6097* (2013.01); *G06K 15/027* (2013.01)
USPC .......................................................... 358/1.2

(58) Field of Classification Search
CPC .................................................... H04N 1/6097
USPC .................................. 358/1.2, 520; 399/27, 49
See application file for complete search history.

(56) References Cited

U.S. PATENT DOCUMENTS 8,027,062 B2 *  9/2011  Fujita ............................. 358/1.9

FOREIGN PATENT DOCUMENTS

| JP | 62-296669 A | 12/1987 |
| JP | 63-185279 A | 7/1988 |
| JP | 8-287217 A | 11/1996 |

* cited by examiner

*Primary Examiner* — Eric A Rust
(74) *Attorney, Agent, or Firm* — Fitzpatrick, Cella, Harper & Scinto

(57) ABSTRACT

An apparatus includes a forming unit; a reading unit; a conversion unit converting a signal corresponding to the image read by the reading unit into a signal indicating a density value; a correction unit performing tone correction on the density value of the signal output by the conversion unit; and a control unit controlling a tone correction setting in the tone correction unit by controlling the reading unit to read a tone correction image that was formed on a recording material by the forming unit. When controlling the tone correction setting, the control unit further changes a setting for image formation in the forming unit and a setting for conversion into a density value in the conversion unit according to the recording material used in the control of the tone correction setting.

7 Claims, 13 Drawing Sheets

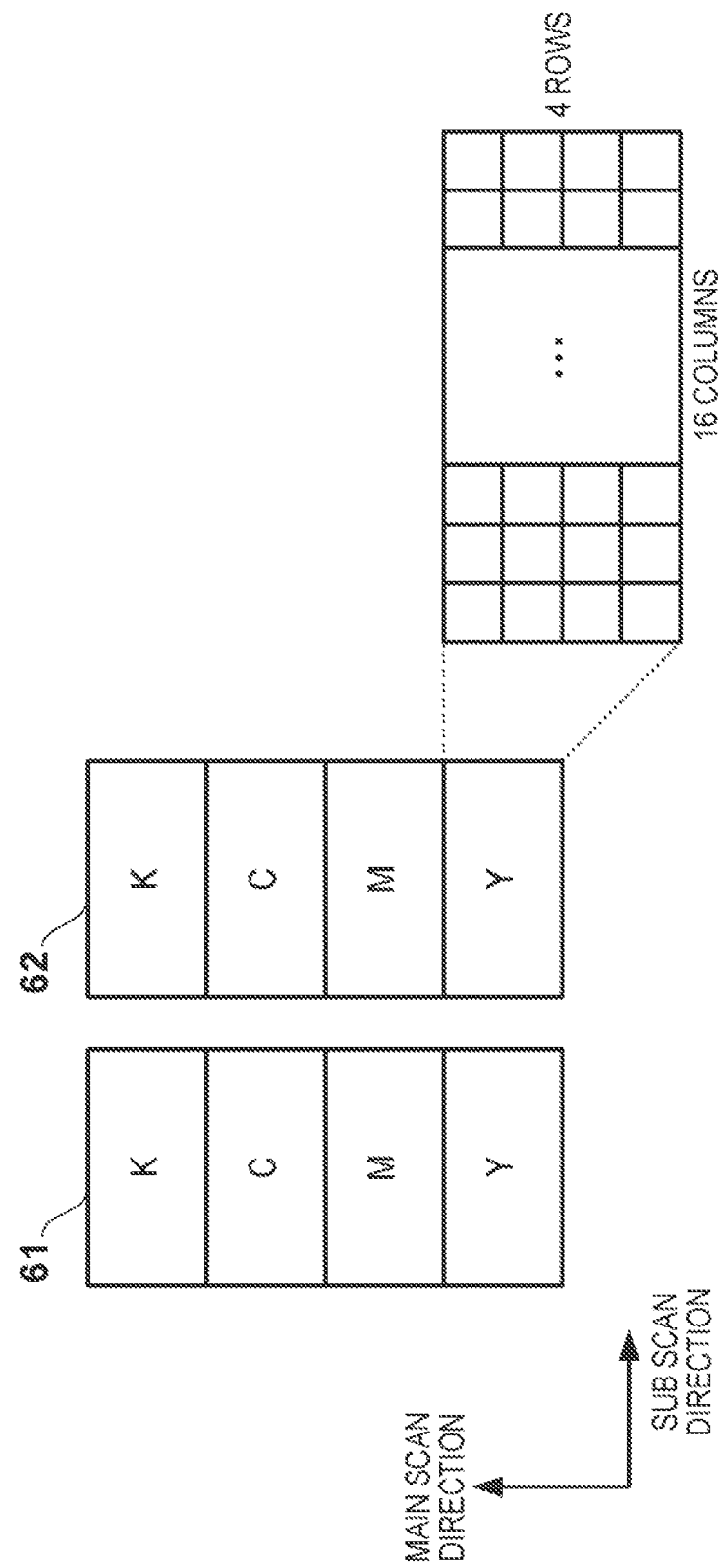

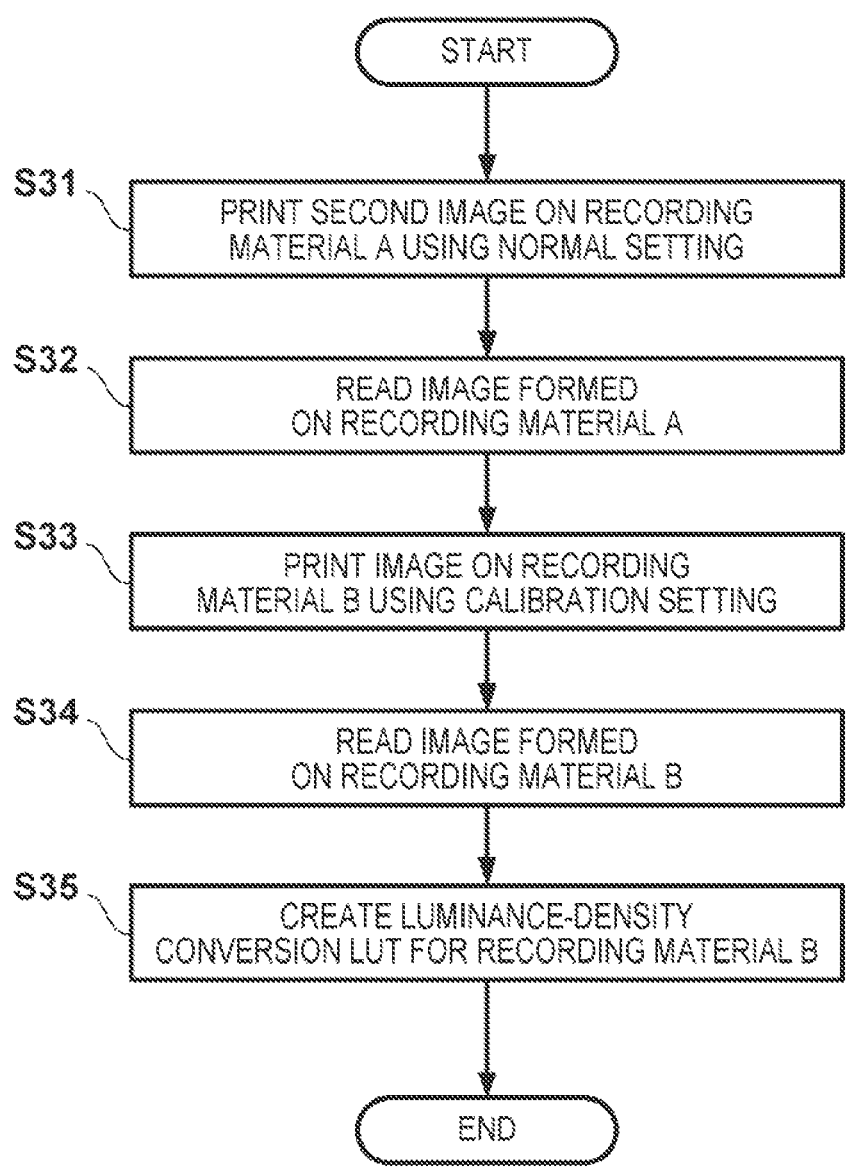

IMAGE FORMING APPARATUS IN WHICH TONE CORRECTION SETTING IS CONTROLLED

BACKGROUND OF THE INVENTION

1. Field of the Invention

The present invention relates to an image forming apparatus such as a printer or a copying machine that performs image formation using an electrophotographic system or the like.

2. Description of the Related Art

Image forming apparatuses execute calibration in order to maintain the quality of images that they form. In Japanese Patent Laid-Open No. 62-296669 and No. 63-185279, image quality stability is improved by forming a specific test pattern on a recording material, reading an image of the formed test pattern, and feeding back the read result to an image formation condition. Furthermore, Japanese Patent Laid-Open No. 08-287217 discloses that an image formation condition is changed according to the recording material in order to maintain image quality with arbitrary recording materials.

When calibration for tone correction has been performed using a certain recording material, and an image formation condition has been determined for that recording material, if the image formation condition is changed thereafter using another recording material, there are cases where, depending on the recording material, the setting exceeds the permitted performance of the image forming apparatus. Specifically, in the case where a recording material α is used in calibration for tone correction, and there is a recording material β for which the output density is lower when using the same toner amount, the image formation condition needs to be changed for the recording material β such that the toner amount is higher. However, if that toner amount exceeds the design range of the image forming apparatus, it is possible for image defects to appear when performing transfer to the recording material β and fixing processing. It is therefore necessary to take measures such as limiting the types of recording materials used in calibration for tone correction to specific types.

SUMMARY OF THE INVENTION

The present invention provides an image forming apparatus that enables the control of a setting related to tone correction using arbitrary recording materials and can prevent a reduction in the precision of a tone correction setting that is dependent on recording material characteristics.

According to a aspect of the present invention, an image forming apparatus includes a forming unit configured to form an image on a recording material; a reading unit configured to read an image on a recording material; a conversion unit configured to convert a signal corresponding to the image read by the reading unit into a signal indicating a density value; a tone correction unit configured to perform tone correction on the density value of the signal output by the conversion unit for formation of the image read by the reading unit on a recording material by the forming unit; and a control unit configured to control a tone correction setting in the tone correction unit by controlling the reading unit to read a tone correction image formed on a recording material by the forming unit. The control unit is further configured to, when controlling the tone correction setting, change a setting for image formation in the forming unit and a setting for conversion into a density value in the conversion unit according to the recording material used in the control of the tone correction setting.

Further features of the present invention will become apparent from the following description of exemplary embodiments with reference to the attached drawings.

BRIEF DESCRIPTION OF THE DRAWINGS

FIG. 11 is a diagram showing an image used in tone correction according to an embodiment;

FIG. 13 is a flowchart of processing for adding a recording material to be used in calibration;

DESCRIPTION OF THE EMBODIMENTS

First Embodiment

Figure 1:
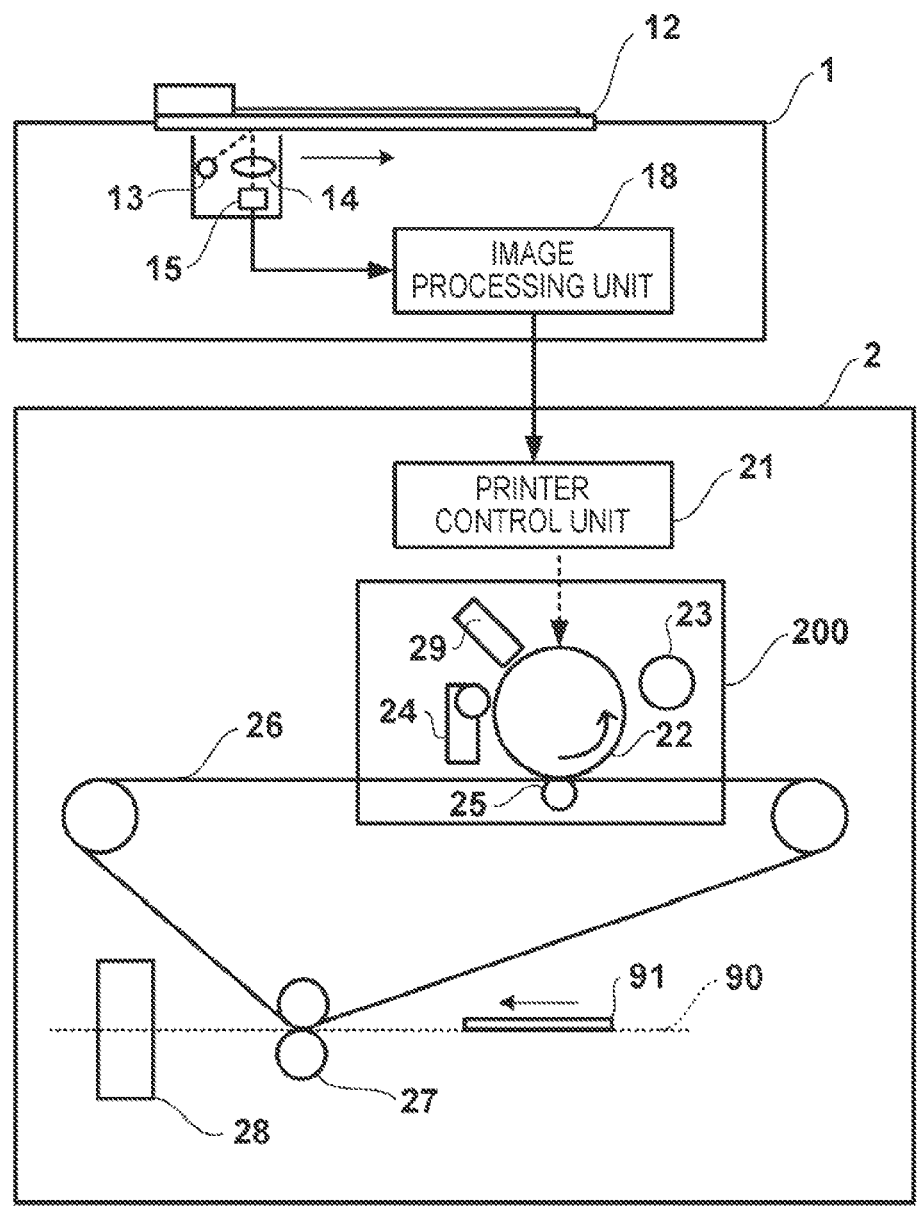
FIG. 1 is a diagram showing the configuration of an image forming apparatus according to an embodiment.

FIG. 1 is a diagram showing the configuration of an image forming apparatus according to the present embodiment. The image forming apparatus has a reading unit 1 that is an image reading unit and a printer unit 2 that is an image forming unit. First, the reading unit 1 will be described. An original document placed on an original platen 12 is irradiated by a light source 13, and an image thereof is formed on a CCD sensor 15 via an optical system 14. An optical system unit including the light source 13, the optical system 14, and the CCD sensor 15 is scanned in the arrow direction, and thus an RGB image signal corresponding to the image of the original document placed on the original platen 12 is obtained.

Figure 2:
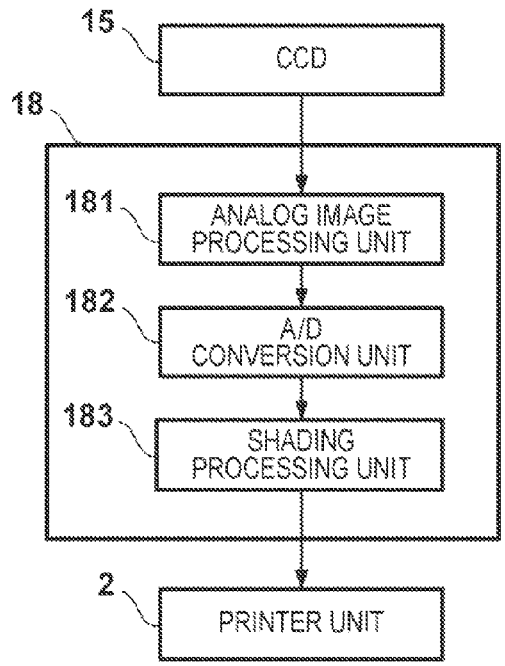
FIG. 2 is a block diagram showing an image processing unit according to an embodiment.

The image signal obtained by the CCD sensor 15 is input to an image processing unit 18 that is shown in detail in FIG. 2. The image signal input to the image processing unit 18 is subjected to amplification processing and the like by an analog image processing unit 181, and the result is converted into a digital signal by an A/D conversion unit 182. The digital signal is then subjected to shading processing by a shading processing unit 183, and the image signal resulting from the shading processing is output to a printer control unit 21 of the printer unit 2 shown in FIG. 1.

Next, the printer unit 2 will be described. The printer control unit 21 generates laser beams that are scanned over photosensitive members 22 corresponding to the colors yellow (Y), magenta (M), cyan (C), and black (K) based on the image signal from the reading unit 1. Note that since the configurations for transferring the various colors of toner images onto an intermediate transfer member 26 are the same, FIG. 1 shows only a member 200 for transferring the yellow toner image onto the intermediate transfer member 26, and the members for transferring the other colors of toner images onto the intermediate transfer member 26 are not shown.

The photosensitive member 22 is charged by a corresponding charging unit 23 so as to have a predetermined potential and then irradiated with a laser beam from the printer control unit 21, and thus an electrostatic latent image is formed on the photosensitive member 22. A developing unit 24 forms a toner image by using toner to develop the electrostatic latent image on the photosensitive member 22. A primary transfer unit 25 transfers the toner image on the photosensitive member 22 onto the intermediate transfer member 26 by applying a voltage. The various colors of toner images formed on the respective photosensitive members 22 are transferred onto the intermediate transfer member 26 so as to be superimposed on each other, and a secondary transfer unit 27 transfers the resulting toner image onto a recording material 91 that is conveyed along a conveying path 90. The toner image transferred onto the recording material 91 is fixed onto the recording material by a fixing unit 28. Note that the members 200 corresponding to the various colors may be provided with surface potential meters 29 that measure the surface potential of the photosensitive members 22 after exposure.

Figure 3:
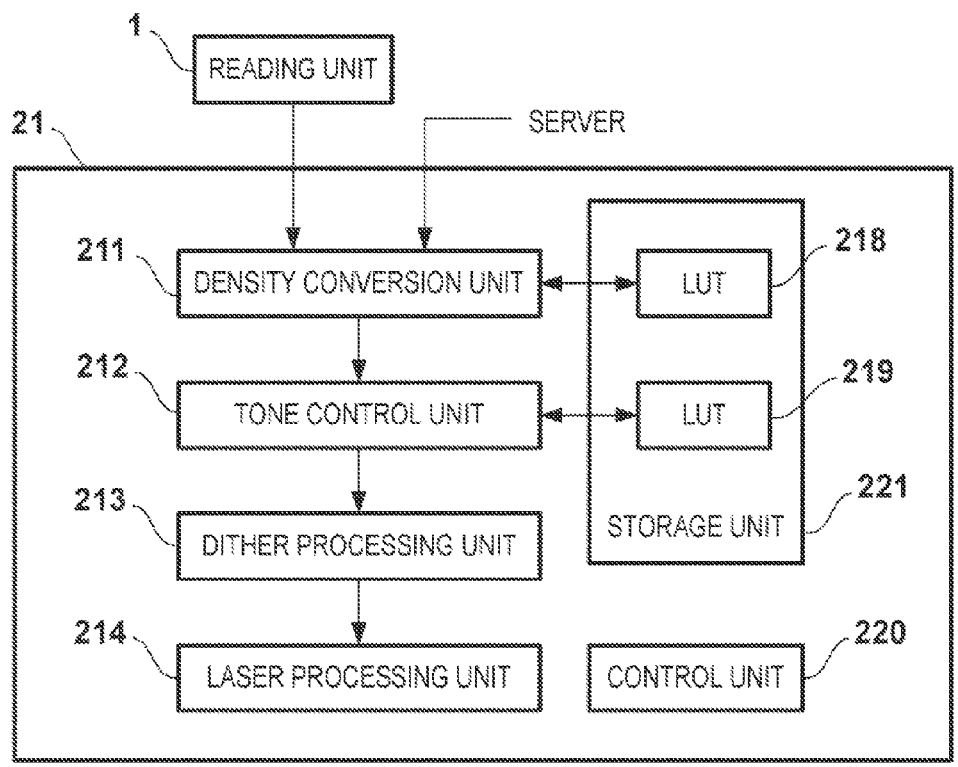
FIG. 3 is a block diagram showing a printer control unit according to an embodiment.

FIG. 3 is a block diagram of the printer control unit 21. Note that a control unit 220 is for controlling the functional blocks of the printer control unit 21, and a storage unit 221 is for storing data used in the control performed by the printer control unit 21, such as patch data used in later-described calibration.

In addition to the image signal from the above-described reading unit 1, the printer control unit 21 can receive an input of an image signal from a server apparatus or the like that is not shown. A density conversion unit 211 converts the input image signal into a density signal indicating a density value. Note that in order to improve processing precision, an input 8-bit image signal is converted to a 10-bit image signal and processed from the density conversion unit 211 to a dither processing unit 213. An LUT 218 is a luminance-density conversion lookup table for converting an image signal including RGB values into a density signal including CMYK values, and the LUT 218 is used by the density conversion unit 211. Note that although described in detail later, an LUT 218 for luminance-density conversion is provided for each recording material used in calibration.

A tone control unit 212 corrects the density signal such that images formed by the printer unit 2 are ideal in consideration of the characteristics of the printer unit 2. An LUT 219 is a lookup table for changing so-called γ characteristics, that is to say, for performing tone correction. Note that the LUT 219 is generated or updated in the later-described tone correction calibration. Also, in the case where the sum of the pixel values of the pixels exceeds a threshold value, the tone control unit 212 reduces the sum of the pixel values using under color removal (UCR) processing or the like. Here, the sum of the pixel values is limited in order to constrain the toner application amount in the printer unit 2. In other words, in the present embodiment, the toner application amount is constrained regardless of the recording material used in calibration, thus preventing image defects and the like that appear due to the toner application amount exceeding the threshold value.

The dither processing unit 213 performs dither processing on the output signal from the tone control unit 212, and outputs the resulting signal to a laser processing unit 214. Specifically, the dither processing unit 213 performs halftone processing for, for example, converting the 10-bit image signal into 4-bit data. The laser processing unit 214 generates, for example, 4-bit tone pulse width modulation (PWM) signals based on the input signal, and uses these signals to drive laser drivers so as to operate semiconductor lasers in order to expose the photosensitive members 22 corresponding to the various colors.

Next is a description of calibration performed using a recording material A (first recording material). Note that the luminance-density conversion LUT 218 for the recording material A is created in advance from the relationship between the density of an image printed on the recording material A and the luminance value of the image signal obtained by the image forming apparatus reading that image, and this LUT is stored in the storage unit 221. In the present embodiment, potential calibration for controlling the contrast potential is performed first, and then tone correction calibration for controlling γ correction is performed. The tone correction LUT 219 is generated or updated through the tone correction calibration.

First, potential calibration will be described with reference to FIG. 4. Note that, for example, the relationship between various atmosphere environments and the contrast potential is obtained in advance, and the contrast potential that is initially set in the potential calibration is determined based on the atmosphere when potential calibration starts. As one example, FIG. 5 shows the relationship between atmospheric moisture amount and contrast potential. In this case, the control unit 220 measures the amount of moisture in the atmosphere when potential calibration starts, and sets the developing bias potential and the like so as to obtain the contrast potential that corresponds to the measured moisture amount.

Figure 4:
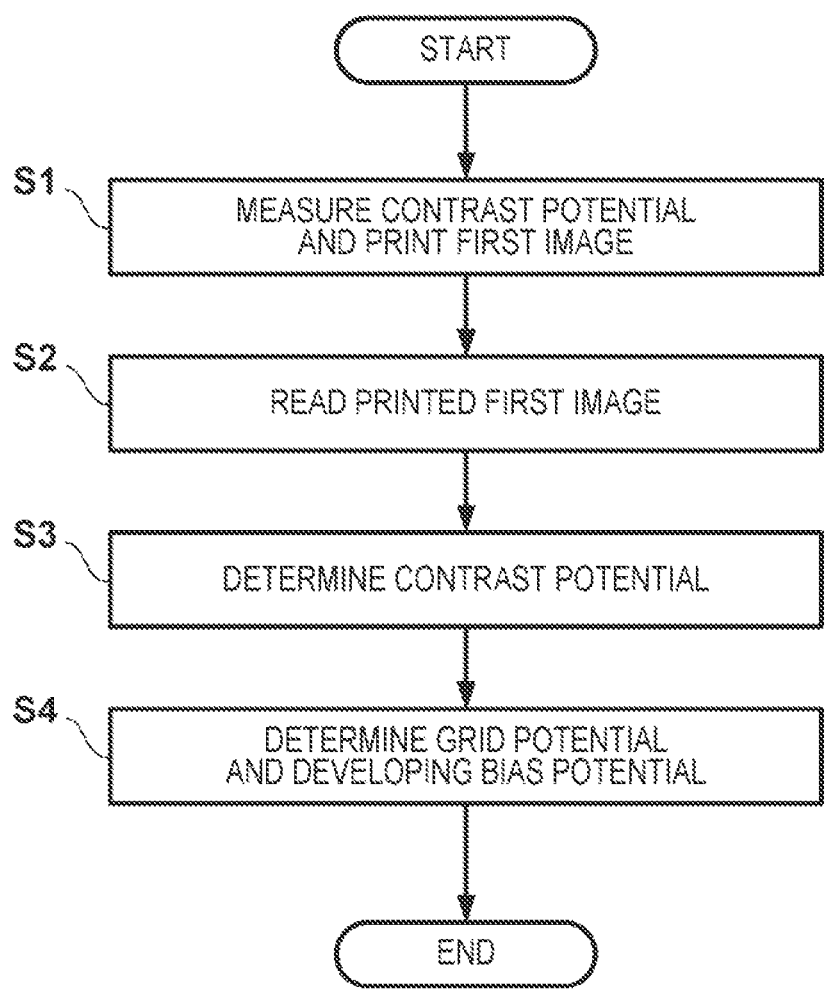
FIG. 4 is a flowchart of contrast potential determination according to an embodiment.
Figure 5:
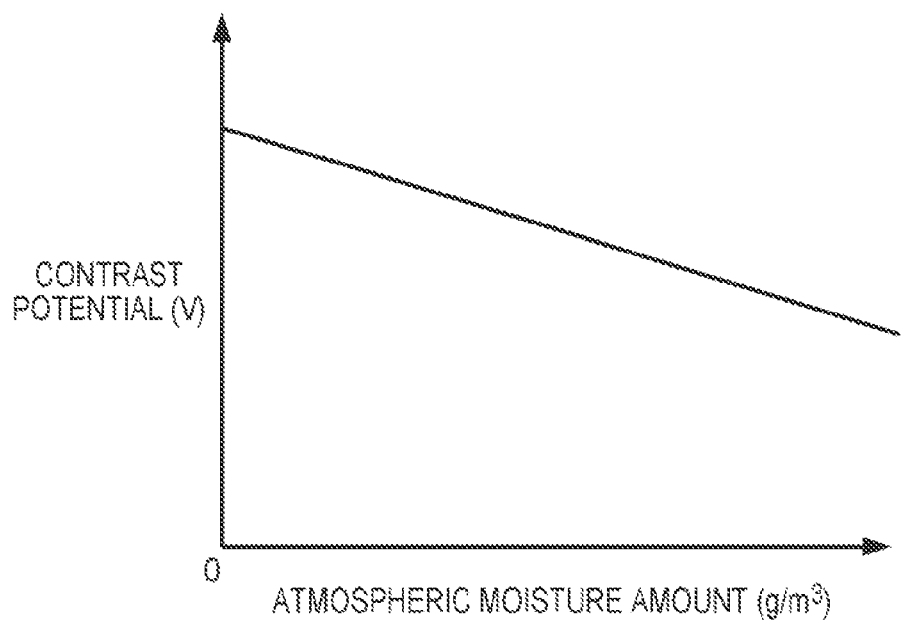
FIG. 5 is a diagram illustrating the determination of a contrast potential initial value according to an embodiment.
Figure 6:
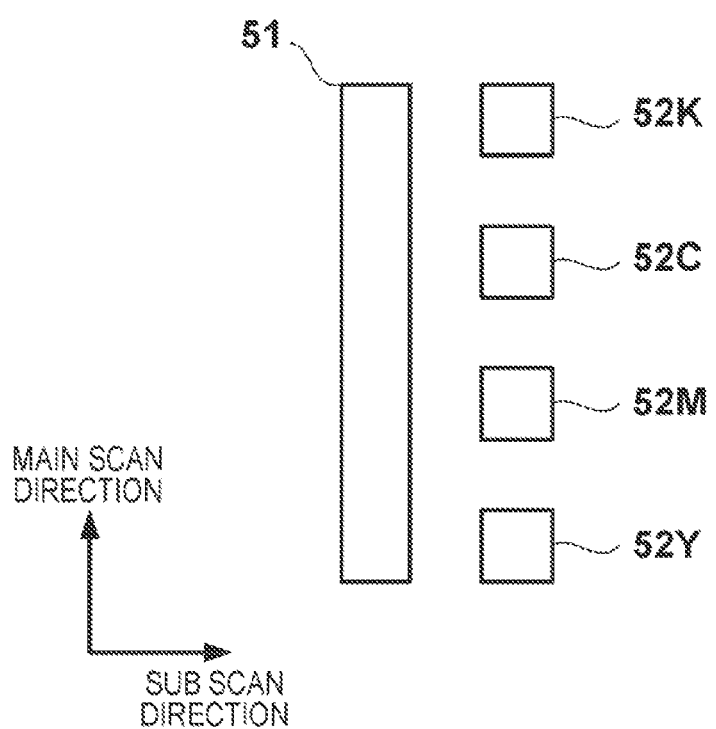
FIG. 6 is a diagram showing an image used in contrast potential determination according to an embodiment.

When the potential calibration starts, in step S1 of FIG. 4, the control unit 220 prints the first image on the recording material A. As shown in FIG. 6, the first image includes a band pattern 51 formed by Y, M, C, and K halftone densities, and patches 52Y, 52M, 52C, and 52K with maximum Y, M, C, and K densities. Note that the band pattern 51 is for visual inspection and detecting the positions of the patches 52Y, 52M, 52C, and 52K, and the patches 52Y, 52M, 52C, and 52K are for the density value detection described hereinafter. Also, when printing the first image, the control unit 220 uses the surface potential meters 29 to measure the potential of the surfaces on which the patches 52Y, 52M, 52C, and 52K were formed on the photosensitive members 22, and calculates contrast potentials by obtaining the difference between the measured potentials and the developing bias potential. Note that the other image formation conditions are set the same as when performing normal image output using the recording material A.

The first image output on the recording material A is set on the original platen 12, and then in step S2, the reading unit 1 reads the first image that was printed on the recording material A, and the density conversion unit 211 converts the image signal read by the reading unit 1 into a density signal using the LUT 218 for the recording material A.

Figure 7:
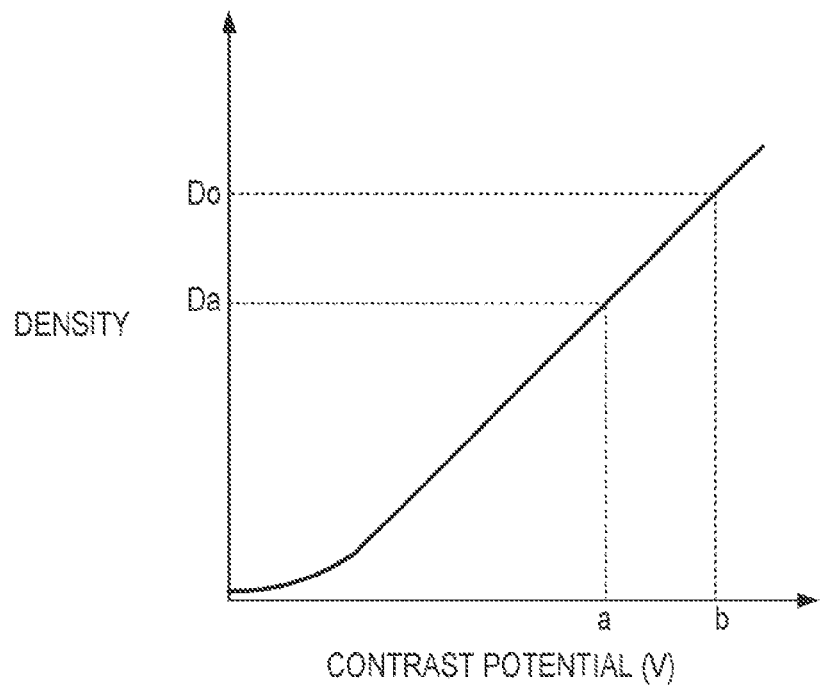
FIG. 7 is a diagram showing the relationship between contrast potential and image density.

Next, in step S3, the printer control unit 21 determines the contrast potential that is to be used in subsequent processing. FIG. 7 is a diagram showing the relationship between contrast potential and image density, and contrast potential and density are normally in a proportional relationship in the vicinity of the maximum density. Accordingly, letting the density detected in step S2 be Da, the maximum density serving as the target be Do, and the contrast potential measured in step S1 be a, the contrast potential b that is actually used is determined using the following expression.

$$b=(a+ka)\times Do/Da \qquad (1)$$

In this expression, ka is a correction coefficient corresponding to the type of developing system.

Figure 8:
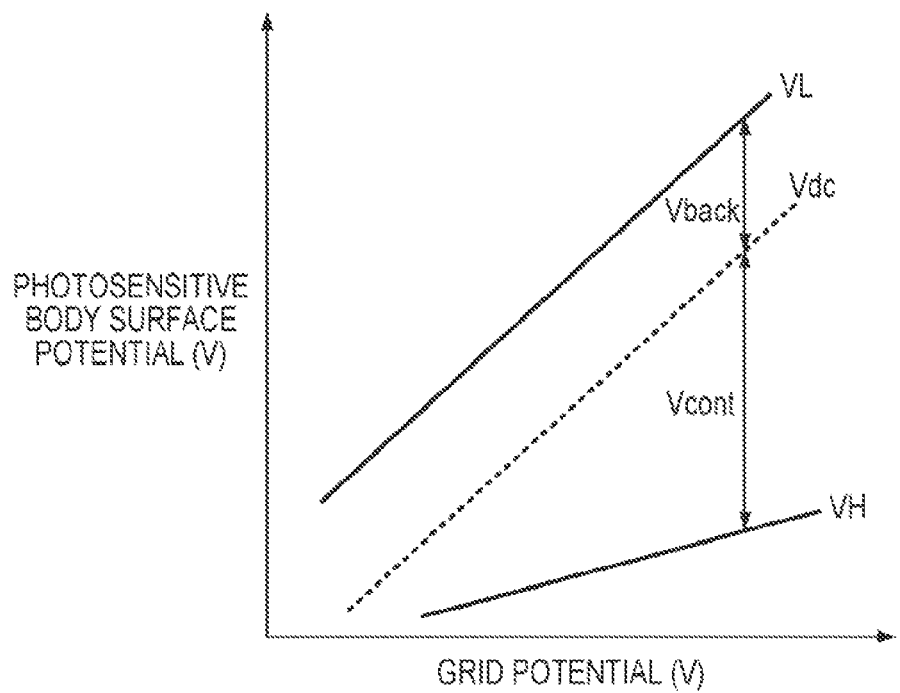
FIG. 8 is a diagram showing the relationship between grid potential and photosensitive member surface potential.

Lastly, in step S4, the control unit 220 determines a grid potential and a developing bias for realizing the contrast potential determined in step S3. FIG. 8 shows the relationship between grid potential and surface potential on a photosensitive member. Note that in FIG. 8, VL indicates the relationship when the laser was scanned with the lowest pulse level, and VH indicates the relationship when the laser was scanned with the highest pulse level. Since grid potential and surface potential on a photosensitive member are in a proportional relationship, the graph shown in FIG. 8 can be obtained by, for example, charging the photosensitive member surface with two grid potentials, scanning the laser, and then measuring the surface potential. The printer control unit 21 then sets a developing bias Vdc by providing a difference Vback from VL. The grid potential is then determined such that the difference between the developing bias Vdc and VH is the contrast potential that was determined in step S3.

Figure 9:
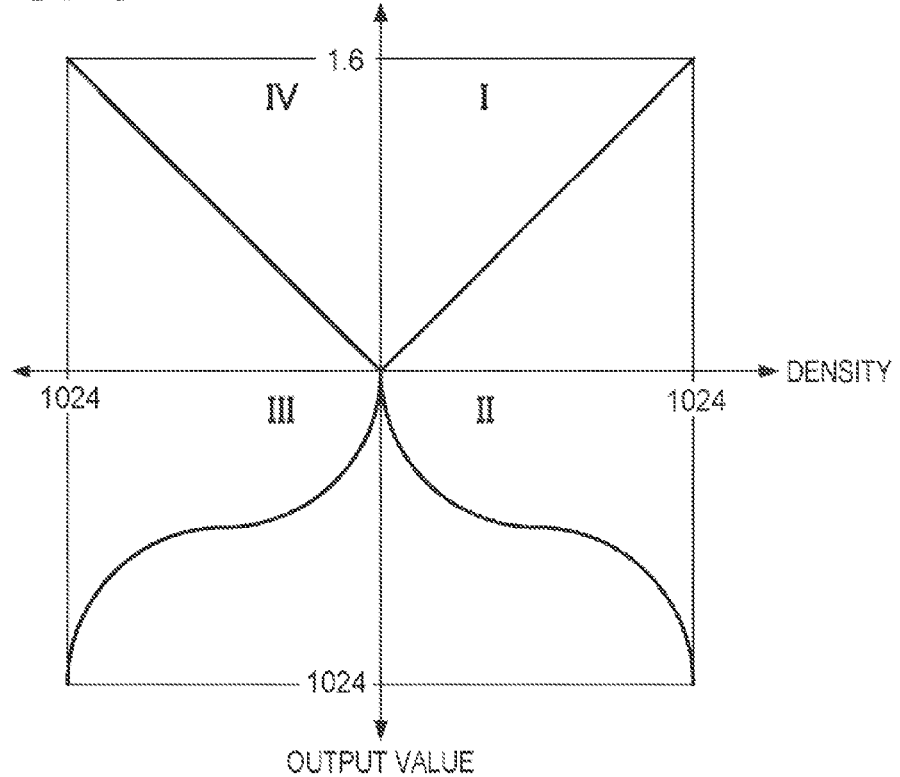
FIG. 9 is a diagram illustrating image forming apparatus characteristics.

Next, the tone correction LUT 219 created in the tone correction calibration will be described. FIG. 9 shows a chart for converting characteristics of the image forming apparatus. A region I shows the relationship between the density of an image printed on a recording material and the density value of a density signal obtained by reading the image with the reading unit 1 and converting the signal using the LUT 218. A region II shows the relationship between the density value of a density signal output by the density conversion unit 211 and a laser output value that corresponds to a density value corrected using the LUT 219. A region III shows the relationship between laser output and the density of an image printed on a recording material using the laser output. A region IV shows the relationship between the density of an original document and the density of an image printed on a recording material based on the original document, that is to say, the overall characteristics of the image forming apparatus.

As shown in FIG. 9, the characteristics in the region III have been corrected by the LUT 219 shown in the region II in order to make the tone characteristics in the region IV linear. The LUT 219 is created by switching the input/output relationship of the characteristics in the region III, which can be measured by performing printing in which the tone control unit 212 is bypassed.

Figure 10:
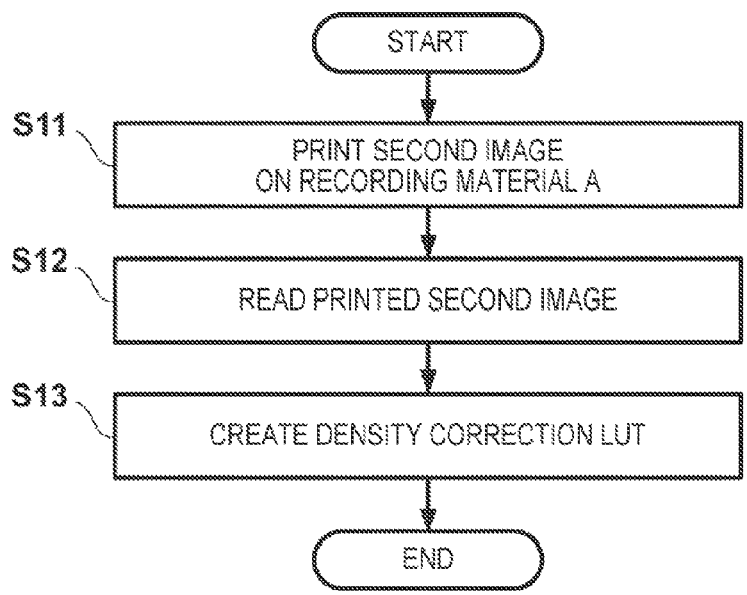
FIG. 10 is a flowchart of tone correction calibration according to an embodiment.

The following describes tone correction calibration with reference to FIG. 10. When the tone correction calibration starts, in step S11, the control unit 220 prints a second image shown in FIG. 11 on the recording material A. Note that the data of the second image is stored in the storage unit 221, and the control unit 220 does not allow the tone control unit 212 to operate when forming the second image. The second image is a patch image for tone correction, and as shown in FIG. 11, includes patch groups having different tones for the colors Y, M, C, and K. Note that in FIG. 11, a group of patches with a total of 64 tones in 4 rows and 16 columns is provided for each of the colors Y, M, C, and K. Here, the tone characteristics in highlight portions can be adjusted so as to be favorable by increasing the number of relatively low-density tones among the tones that can be used.

For example, in FIG. 11, a patch 61 is an approximately 160 lpi to 180 lpi image, and a patch 62 is an approximately 250 lpi to 300 lpi image. This is because, for example, tone images are created with a resolution of approximately 160 lpi to 180 lpi, and line images including characters and the like are created with a resolution of approximately 250 lpi to 300 lpi. Note that although the number of tones used is the same in the two patches 61 and 62 having different resolutions, in the case where the tone characteristics greatly differ at different resolutions, the number of tones may be changed according to the resolution.

Returning to FIG. 10, the recording material A is set on the original platen 12, and then in step S12, the reading unit 1 reads the second image, and the density conversion unit 211 converts the image read by the reading unit 1 into a density value using the LUT 218 for the recording material A. The control unit 220 obtains the characteristics shown in a quadrant III in FIG. 9 by relating density values obtained in step S12 with density values output to the laser processing unit 214 in step S11, and thus generates the tone correction LUT 219 in step S13. Note that the number of tones obtained in the processing shown in FIG. 10 is the number of tones used in the second image, and therefore data between used tones are generated by interpolation.

Note that the potential calibration and the tone correction calibration can be carried out in succession so as to effectively correct fluctuations in characteristics and output an optimum image.

Figure 12A:
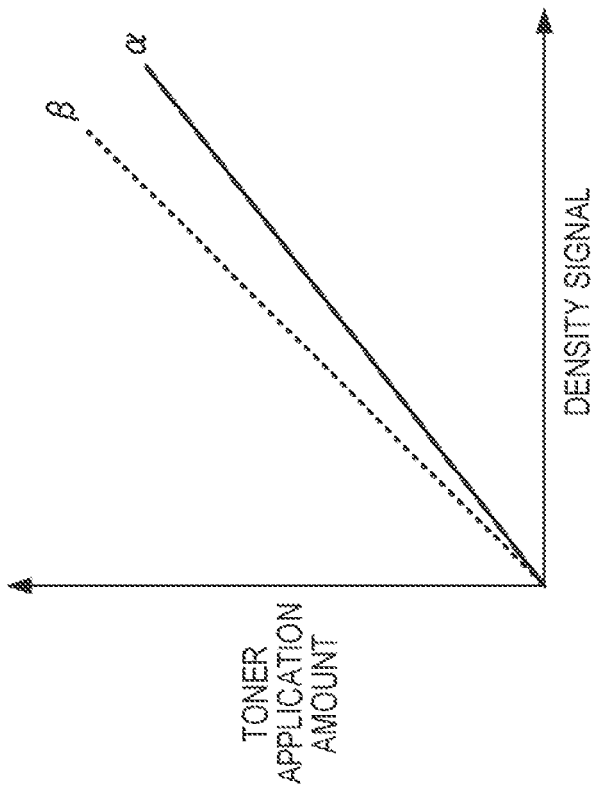
FIGS. 12A and 12B are diagrams showing toner application amounts for outputting the same density on different recording materials.
Figure 12B:
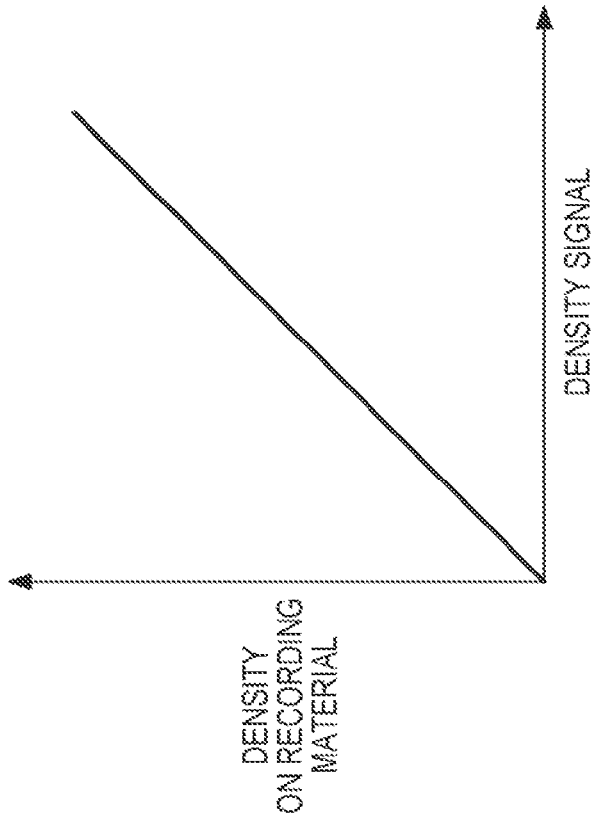

For example, assume that recording materials α and β are provided, and that the density on the recording material β is lower than that on the recording material α when the toner application amount on the intermediate transfer member 26 is the same. In this case, in order to set primary color output density characteristics of both the recording materials α and β as shown in FIG. 12A, the toner application amount of the recording material β needs to be set higher than the toner application amount of the recording material α for the same density, as shown in FIG. 12B. If output in a secondary color, a thirdly color, and the like is performed in this state, a greater-than-expected amount of toner will be applied to the intermediate transfer member 26 and the recording material, and it is possible for transfer defects and fixing defects to occur.

In the present embodiment, an LUT 218 is provided for each recording material used in the tone correction calibration, and the processing in the region I in FIG. 9 in the tone correction calibration is performed using the LUT 218 corresponding to the recording material that is being used. Accordingly, differences between recording materials that are used is absorbed in the processing in the region I in FIG. 9, and the same LUT 219 can be generated regardless of the type of recording material in the processing in the region II in FIG. 9. Also, the sum of the signal levels of the image signals immediately before tone correction is performed using the LUT 219 is constrained by the tone control unit 212 using UCR or the like, and thus it is possible to prevent the toner application amount from becoming excessively high.

Next, processing for generating the luminance-density conversion LUT 218 for the recording material B (second recording material) in order to use the recording material B in tone correction calibration will be described with reference to FIG. 13. Note that in the following description, the lookup table for luminance-density conversion corresponding to the recording material A is referred to as the LUT 218A, and the lookup table for luminance-density conversion corresponding to the recording material B is referred to as the LUT 218B.

In step S31, the control unit 220 prints the second image shown in FIG. 11 on the recording material A. Note that the image formation conditions are the same as those when performing normal image printing. Next, in step S32, the reading unit 1 reads the image that was printed on the recording material A in step S31 and obtains an RGB signal, that is to say, luminance values. Next, in step S33, the control unit 220 prints the second image shown in FIG. 11 on the recording material B. Note that in step S33, the transfer condition of the secondary transfer unit 27, that is to say the transfer bias applied by the secondary transfer unit 27, is changed to a later-described calibration setting value. The other image formation conditions are the same as the conditions in step S31. Next, in step S34, the reading unit 1 reads the image that was printed on the recording material B in step S33 and obtains an RGB signal, that is to say, luminance values.

Figure 14A:
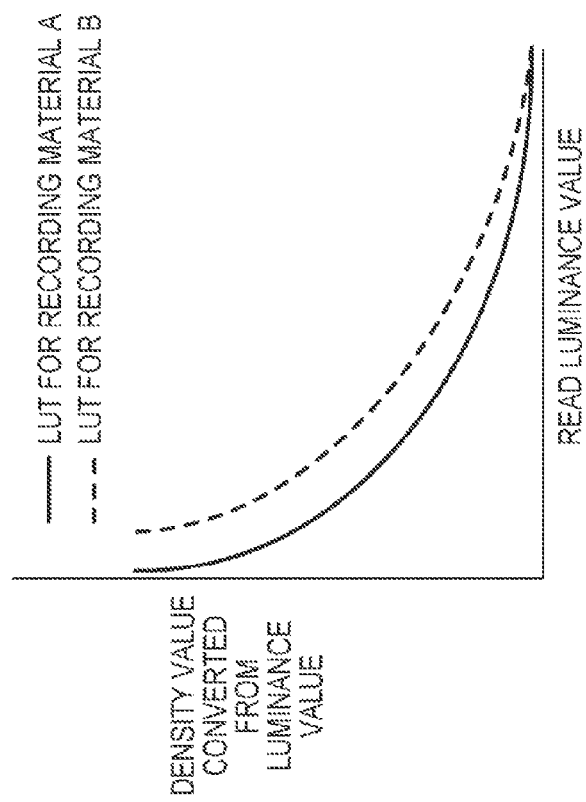
FIGS. 14A and 14B are diagrams illustrating luminance-density conversion LUTs for recording materials.
Figure 14B:
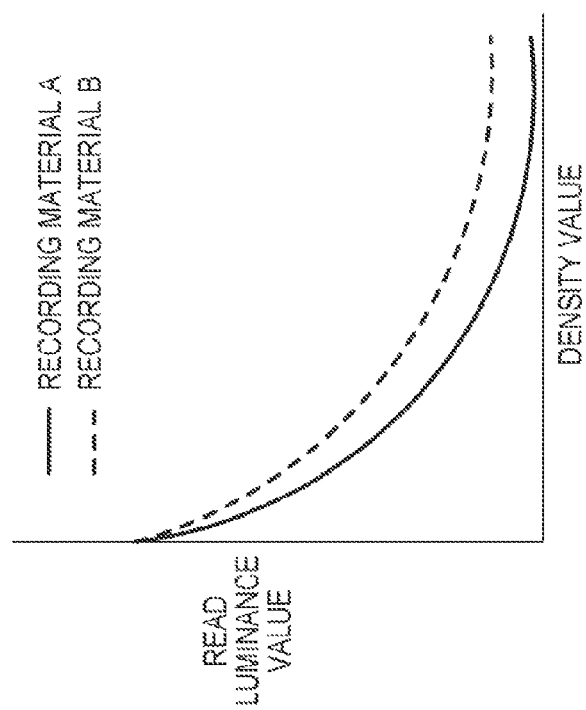

In step S35, the control unit 220 generates the LUT 218B for the recording material B based on the luminance values acquired in step S32 and the luminance values acquired in step S34. FIG. 14A shows the relationship between the image density values and the luminance values acquired in steps S32 and S34, and FIG. 14B shows the relationship between luminance and density for the LUTs 218 for the recording materials A and B. The control unit 220 generates the LUT 218B by correcting the LUT 218A using the difference between the luminance values of the recording material A and the recording material B in FIG. 14A, and stores the LUT 218B in the storage unit 221.

Figure 15:
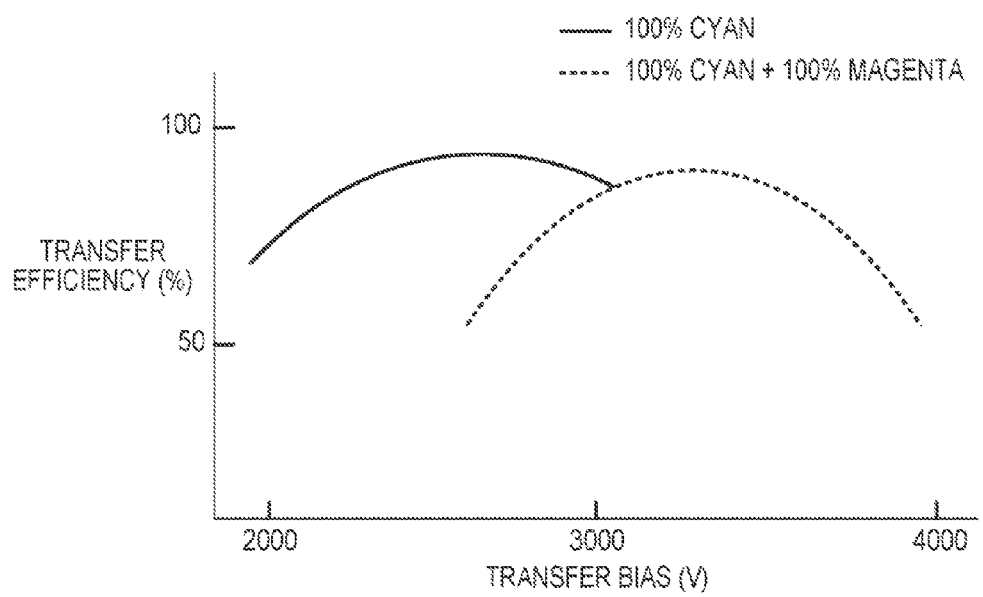
FIG. 15 is a diagram showing the relationship between transfer bias and transfer efficiency.

Next is a description of the reason for changing the transfer bias of the secondary transfer unit 27 in step S33 of FIG. 13. FIG. 15 shows the relationship between the transfer bias of the secondary transfer unit 27 and transfer efficiency. As shown in FIG. 15, the transfer efficiency decreases if the transfer bias is excessively high or excessively low. If the transfer efficiency decreases, the amount of toner that is transferred to the recording material decreases, and the density of the image formed on the recording material decreases. Note that the reason why the transfer efficiency decreases as the transfer bias decreases is that the electric field for moving the toner on the intermediate transfer member 26 to the recording material becomes smaller. Also, the reason why the transfer efficiency decreases as the transfer bias increases is that the transfer current becomes excessively high, and the polarity of the toner is reversed due to discharge, thus resulting in the phenomenon in which toner is moved back to the intermediate transfer member 26.

Furthermore, as shown in FIG. 15, the transfer efficiency is also dependent on the amount of toner on the intermediate transfer member 26. The solid line in FIG. 15 shows the case where cyan toner was applied at the maximum density, and the dotted line shows the case where cyan and magenta toner were both applied at the maximum density. As the amount of toner moved to the recording material increases, there is an increase in the transfer bias at which the transfer efficiency is optimum. Since images are normally formed by superimposing multiple colors of toner in image formation, the transfer bias is determined in consideration of the maximum value of the amount of toner applied to the intermediate transfer member 26. Accordingly, in the case of forming an image with a single color (primary color), the toner application amount is low, and thus there are cases where the transfer efficiency drops. Since the second image has monochrome patches, it is possible for the transfer efficiency to degrade if the transfer bias used when printing the second image on the recording material B is the same as that when performing normal image forming. This situation is shown in FIG. 16.

Figure 16:
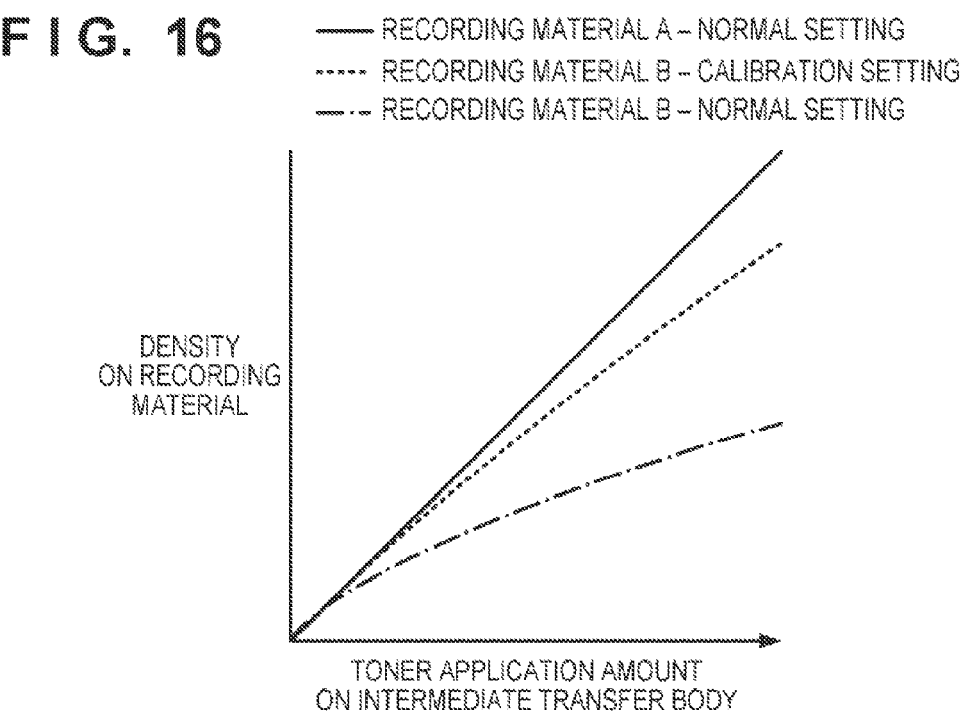
FIG. 16 is a diagram showing the relationship between toner application amount on an intermediate transfer member and density on a recording material.

FIG. 16 shows the relationship between the toner application amount on the intermediate transfer member 26 and the density of the image transferred to the recording material. Note that the recording material A is high-quality paper with a surface roughness Rz of 8 μm, and the recording material B is recycled paper with a surface roughness Rz of 20 μm. The solid line in FIG. 16 shows the relationship when an image is transferred to the recording material A using the normal setting, that is to say, the transfer bias used in normal image formation. Also, the dashed-dotted line in FIG. 16 shows the relationship when an image is transferred to the recording material B using the transfer bias used in normal image formation. It can be understood from FIG. 16 that when an image is transferred to the recording material B using the normal transfer bias, density variation on the recording material is low, thus leading to degradation in the calibration precision. Accordingly, in the present embodiment, in step S33 of FIG. 13, the transfer bias is set to the calibration setting such that a value lower than normal is used. The dotted line in FIG. 16 shows the relationship when an image is transferred to the recording material B using the calibration setting transfer bias.

Note that the reason that the density differs between the images formed on the recording materials A and B in FIG. 16 is that the transfer efficiency is also dependent on the surface roughness of the recording material, the resistance value, and the like. Accordingly, when the processing in FIG. 13 is executed, the calibration setting in step S33 is in accordance with the recording material, and the value thereof is stored in the storage unit 221 in advance.

Now assume the case where the toner application amount on the intermediate transfer member 26 is the same, and the transfer efficiency for the recording material A under the normal setting and the transfer efficiency for the recording material B under the calibration setting are substantially the same. In this case, the precision with which an image printed on the recording material A under the normal setting is read by the reading unit 1 and converted into density using the LUT 218A is substantially the same as the precision with which an image printed on the recording material B under the calibration setting is read by the reading unit 1 and converted into density using the LUT 218B. Precision can therefore be maintained regardless of the recording material when generating the LUT 219 used by the tone control unit 212.

Figure 17:
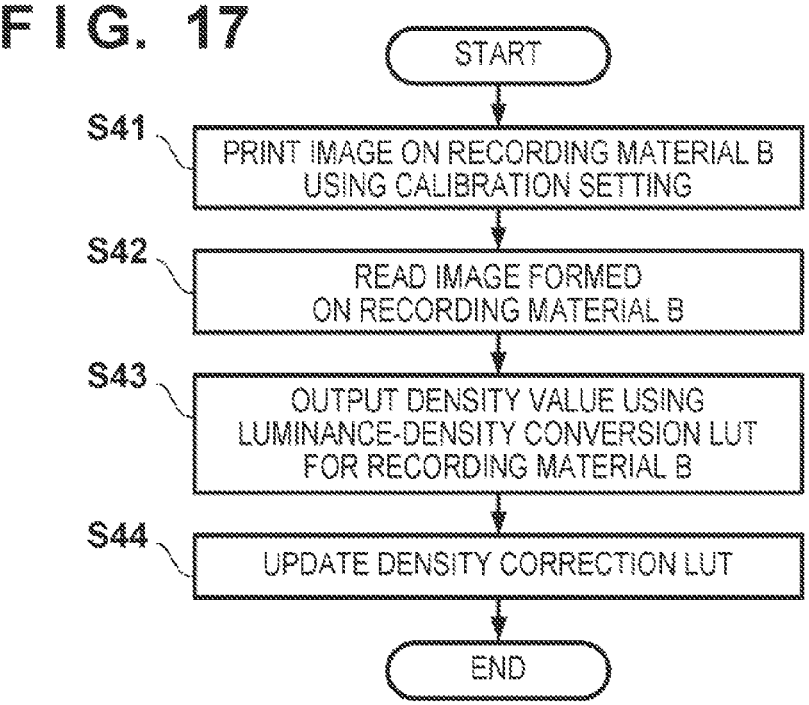
FIG. 17 is a flowchart of tone correction calibration performed on an added recording material according to an embodiment.

The following describes the tone correction calibration performed using the recording material B with reference to FIG. 17. When the tone correction calibration using the recording material B starts, in step S41, the control unit 220 prints the second image on the recording material B, for example. Note that the image formation conditions used here are the same as the conditions used in step S33 of FIG. 13. In other words, the image formation conditions used here are the same as the conditions used when performing printing on the recording material B in order to create the LUT 218B. Also, the tone correction employing the tone correction LUT 219 is not executed by the tone control unit 212.

Next, in step S42, the reading unit 1 reads the image that was printed on the recording material B in step S41, and in step S43, the density conversion unit 211 converts the read image into density values using the LUT 218B. Thereafter, in step S44, the control unit 220 creates or updates the density correction LUT 219 based on the densities obtained in step S43 and the densities of the image printed in step S41.

Note that the calibration using the recording material A is the same as the procedure shown in FIG. 10. Specifically, differences from the procedure shown in FIG. 17 are that image forming is performed using the normal setting, and conversion into a density signal is performed using the LUT 219A in step S42.

As described above, according to the procedure shown in FIG. 13, the luminance-density conversion LUT 218 is created for an added recording material in order to be used in calibration. The LUT 218 that corresponds to the recording material is used, and an image formation condition (e.g., the transfer bias) of the printer unit 2 is set to a value that compensates, to a certain extent, for variations in the characteristics of the printer unit 2 according to the recording material. This enables executing calibration of the density correction LUT 219 using an arbitrary recording material while preventing a decrease in precision.

Note that in the present embodiment, the transfer bias of the secondary transfer unit 27 is changed as an image formation condition for calibration. However, it is possible to change other image formation conditions that are related to control for transferring and fixing a toner image formed on an image carrier such as the intermediate transfer member 26 onto a recording material, such as the fixing temperature. Also, the image formation condition set here is a value that compensates, to a certain extent, for variations in the characteristics of the printer unit 2 according to the recording material. In other words, a decrease in precision can be prevented by using a setting according to which the characteristics in the region III in FIG. 9 are substantially constant regardless of the recording material. Also, in the processing shown in FIG. 13, the order in which images are formed on the recording materials A and B and the order in which the images are read are arbitrary.

Second Embodiment

In the first embodiment, the calibration setting of the added recording material B is saved in the storage unit 221 of the printer control unit 21. In the present embodiment, the calibration setting of the added recording material B is set dynamically. Specifically, an image is printed on the recording material B while varying the transfer bias of the secondary transfer unit 27, each formed image is read by the reading unit 1, it is determined for which transfer bias the density is the highest, for example, and the determined transfer bias is used as the calibration setting.

Figure 18:
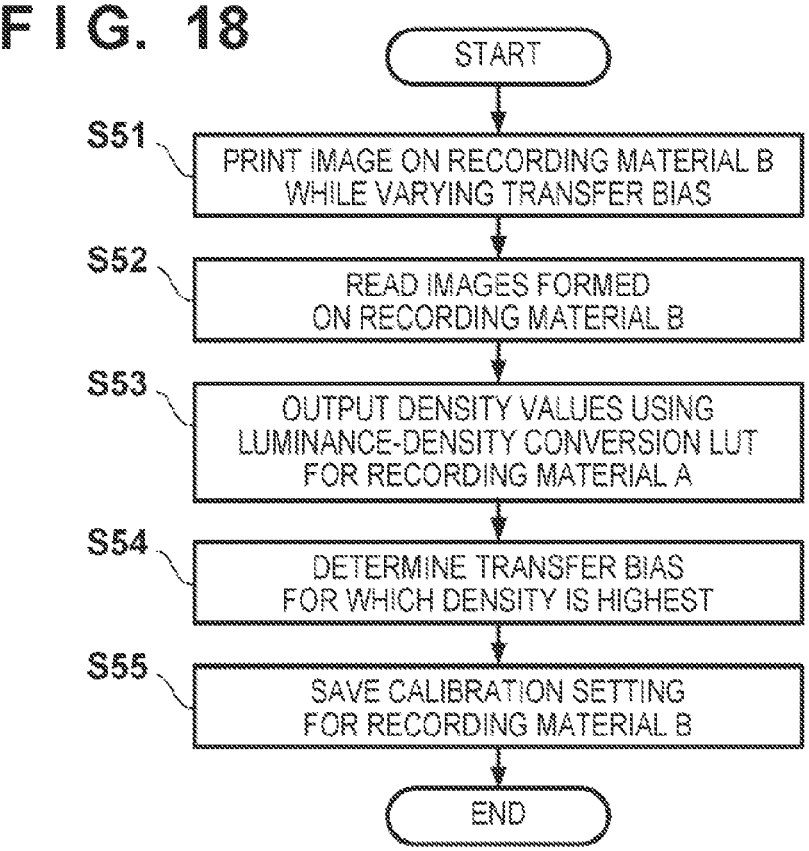
FIG. 18 is a flowchart of processing for determining a calibration setting according to an embodiment.
Figure 19:
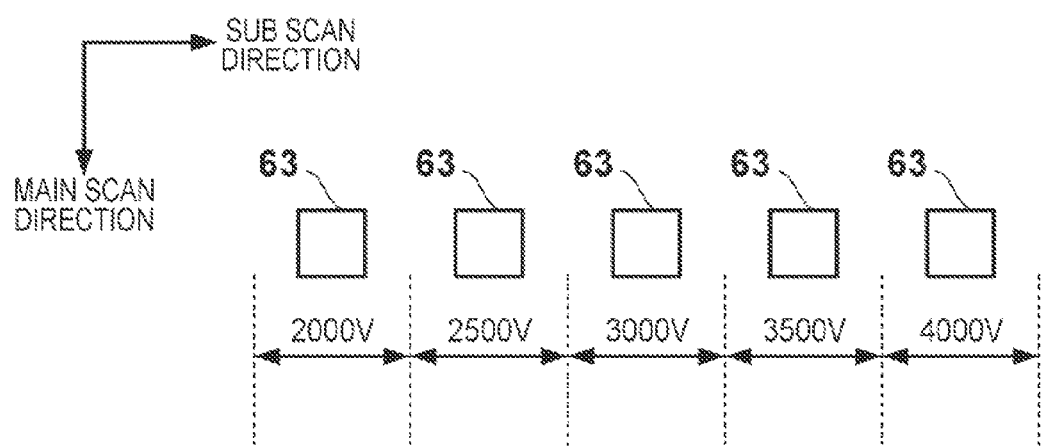
FIG. 19 is a diagram showing an image formed in the processing for determining a calibration setting according to an embodiment.

FIG. 18 is a flowchart of processing for determining the calibration setting. When the processing for determining the calibration setting for the recording material B starts, in step S51, the control unit 220 prints the same image multiple times on the recording material B while varying the transfer bias. Regarding the formed image, for example, a 100% cyan patch 63 is formed five times as shown in FIG. 19, with the transfer bias used when transferring the patches to the recording material B being changed from 2000 V to 4000 V in units of 500 V, for example. Note that the color used here is not limited to being cyan.

In step S52, the reading unit 1 reads the images that were printed on the recording material B in step S51, and in step S53, the density conversion unit 211 converts the images into density signals using the LUT 218A. Then, in step S54, the control unit 220 specifies the patch 63 having the highest density, and determines which transfer bias was used when transferring that patch 63. In step S55, the control unit 220 saves the determined transfer bias in the storage unit 221 as the recording material B calibration setting. Note that this is performed with the goal of selecting a transfer bias that approaches the characteristics under the recording material A normal setting shown in FIG. 16, and although the transfer bias for which the density is the highest is illustrated as an example, another selection criterion can be used. In other words, in the present embodiment, it is sufficient that multiple images are printed on a recording material while varying an image formation condition (e.g., the transfer bias), the relationship between the image formation condition and density is measured, and the transfer bias is determined based on the relationship.

As described above, when performing tone correction calibration, a setting for image formation in the printer unit 2 and a setting for conversion into density values in the density conversion unit 211 are changed according to the recording material used in calibration. This configuration enables using an arbitrary recording material in calibration. As one specific example, a setting related to the transfer of a toner image onto a recording material or the fixing of a toner image onto a recording material in the printer unit 2 is changed according to the recording material. As another example, a setting related to the conversion of luminance values and density values in the density conversion unit 211 is changed according to the recording material.

Note that a setting for image formation in the printer unit 2 can be dynamically determined by forming multiple images on a recording material using multiple settings, reading the images using the reading unit 1, and determining the relationship between the settings for image formation and density.

Also, in the generation of the LUT 218 for the second recording material, first the second image is formed on the first recording material using the setting for the first recording material as the setting in the printer unit 2, and the second image is formed on the second recording material using the setting for the second recording material. Then, the LUT 218 for the second recording material can be easily generated by using the reading unit 1 to read the images formed on the first recording material and the second recording material so as to obtain the difference between the luminance values, and correcting the LUT 218 for the first image using the difference between the luminance values.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-129541, filed Jun. 9, 2011, which is hereby incorporated by reference herein in its entirety.

What is claimed is:

1. An image forming apparatus comprising:
   a forming unit configured to form an image on a recording material by applying an image formation condition;
   a reading unit configured to read an image on a recording material, and to output a luminance value;

a conversion unit configured to convert the luminance value output by the reading unit into a density value using conversion setting information;

a tone correction unit configured to perform tone correction on the density value output by the conversion unit for formation of the image read by the reading unit on a recording material by the forming unit;

a storage unit configured to store first conversion setting information for a first recording material; and a control unit configured to control the forming unit to form a tone correction image on the first recording material using a first image formation condition that corresponds to the first recording material, control the forming unit to form the tone correction image on a second recording material different from the first recording material using a second image formation condition that corresponds to the second recording material and is different from the first image formation condition, and generate second conversion setting information for the second recording material using the first conversion setting information stored by the storage unit and a difference between values obtained by the reading unit reading the tone correction images formed on the first recording material and the second recording material, wherein the first conversion setting information is used for converting a luminance value of the image formed on the first recording material into a density value on the first recording material, and the second conversion setting information is used for converting a luminance value of the image formed on the second recording material into the density value on the first recording material.

2. The image forming apparatus according to claim 1, wherein the image formation condition is a condition related to transfer of a toner image onto a recording material or fixing of a toner image onto a recording material.

3. The image forming apparatus according to claim 1, wherein the second image formation condition is set based on a type of the second recording material.

4. An image forming apparatus comprising:

a correction unit configured to correct image data based on a correction condition;

a forming unit configured to be controlled by an image formation condition corresponding to a recording material, and form an image on the recording material based on the corrected image data;

an obtaining unit configured to obtain read data read by a reading unit reading a measurement image formed on a recording medium by the image forming unit;

a conversion unit configured to convert the read data obtained by the obtaining unit into density data based on a conversion condition;

a first generating unit configured to generate the correction condition based on the density data;

a storage unit configured to store a first conversion condition for a specific recording material;

a second generating unit configured to generate a second conversion condition for another recording material different from the specific recording material based on first reading data, second reading data, and the first conversion condition stored in the storage unit, the first reading data being obtained by the obtaining unit from the reading unit reading a first pattern image formed on the specific recording material by the forming unit, and the second reading data being obtained by the obtaining unit from the reading unit reading a second pattern image formed on the other recording material by the forming unit; and a control unit configured to control the forming unit based on a first image formation condition for the specific recording material to form the first pattern image on the specific recording material, and control the forming unit based on a second image formation condition for the other recording material to form the second pattern image on the other recording material, wherein the first conversion condition is used for converting reading data of a measurement image formed on the specific recording material into density data on the specific recording material, and the second conversion condition is used for converting reading data of a measurement image formed on the other recording material into density data on the specific recording material.

5. The image forming apparatus according to claim 4, wherein the control unit is configured to control the forming unit based on the first image formation condition for the specific recording material when the forming unit forms the measurement image on the specific recording material, and control the forming unit based on the second image formation condition for the other recording material when the forming unit forms the measurement image on the other recording material.

6. The image forming apparatus according to claim 4, wherein the forming unit includes an image carrier and a transfer unit configured to transfer an image on the image carrier onto the recording material, the image on the image carrier is transferred onto the recording material by applying a transfer bias to the transfer unit, and the image formation condition is the transfer bias applied to the transfer unit.

7. The image forming apparatus according to claim 4, wherein the forming unit includes a fixing unit to fix the image on the recoding material by heat, and the image formation condition is the fixing temperature of the fixing unit.

* * * * *